Jan. 18, 1949.  W. C. KELLOGG ET AL  2,459,654
REED SEAL FOR ROTATING EQUIPMENT
Filed May 31, 1946
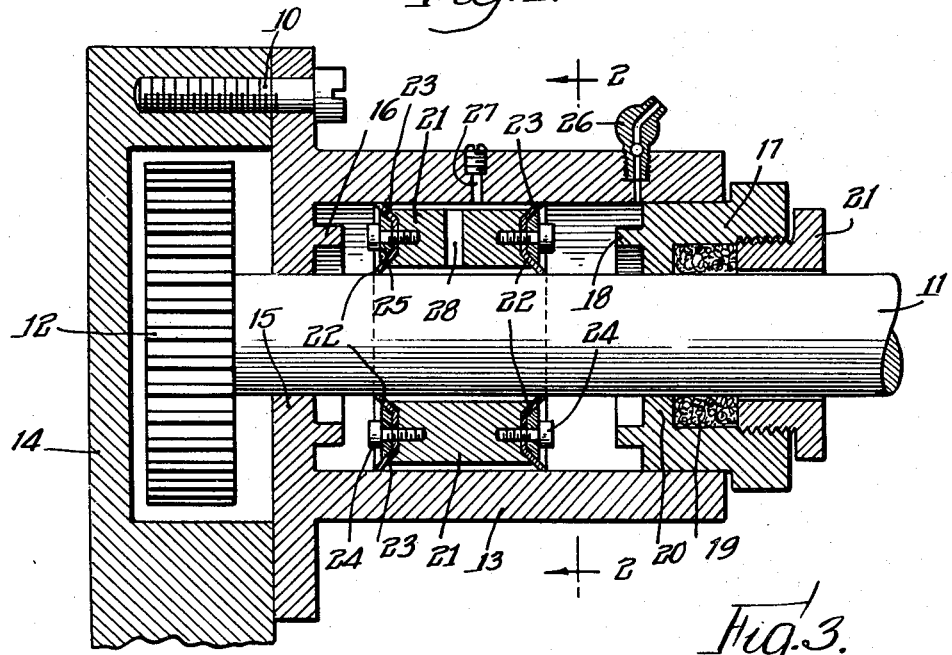
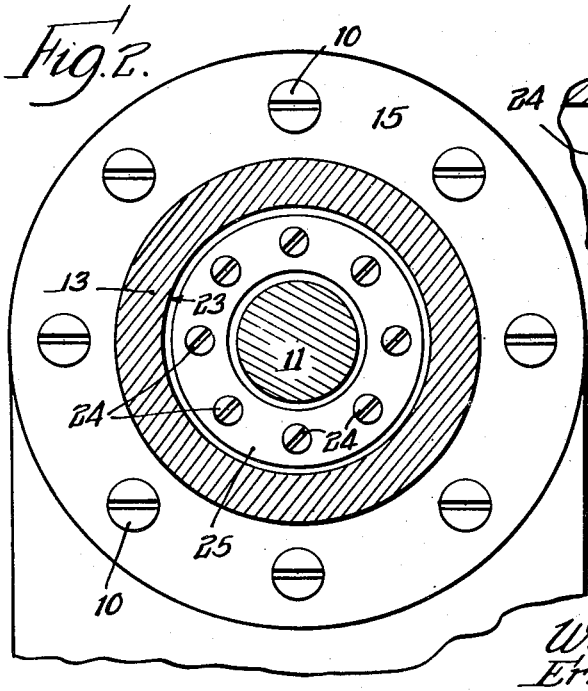
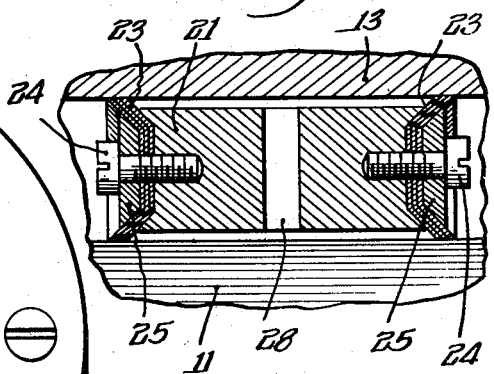
INVENTORS
Warren C. Kellogg
Ernest Hanshaw
By: Walter M. Fuller
Atty.

UNITED STATES PATENT OFFICE 2,459,654

REED SEAL FOR ROTATING EQUIPMENT

Warren C. Kellogg and Ernest Hanshaw, Detroit, Mich., assignors to Renniks Company, Detroit, Mich., a copartnership Application May 31, 1946, Serial No. 673,651

3 Claims. (Cl. 286—9)

One of the principal problems or difficulties encountered or involved in employing pressure-sealing means in rotating machinery, such means incorporating or embodying one or a plurality of nested or interfitted, hollow, sheet-metal or comparable, truncated-cone reeds bearing edgewise on one of the rotary members, has been that such bearing area has been necessarily relatively small, and inasmuch as the position of such reed-means in respect to such revolving member, a shaft for example, is fixed, it is likely to make for difficulty in proper and adequate lubrication with resulting relatively rapid wear of the shaft or the seal, or of both.

This perplexity was solved, however, by the discovery and invention of the design and mode of functioning of the structure constituting the subject-matter of the present invention.

That is to say, it was revealed, based on substantial research and investigation, that the reed-seal could be designed and constructed to bear on both the stationary shaft-housing and the revolving shaft and be free to rotate with the latter, the speed of slippage of the active edge of the reed across the surface of the shaft being materially reduced, and, in effect, the bearing area of the reed on the shaft is actually increased.

The novel feature of the innovatory structure is that this rotating reed-seal is also allowed to and does move very slowly along the axis of the shaft, and, since such lateral travel of the reed is properly and adequately controlled, the bearing area of the reed on the shaft and shaft-housing is greatly augmented.

These two cooperative and complementary features of operation are preferably employed conjointly, but when understood, it will be obvious that either one could be used singly.

In order that those acquainted with and skilled in this art may readily comprehend this invention from both structural and operative standpoints, a present preferred embodiment thereof has been illustrated in detail in the accompanying drawing, which should be considered in connection with the following description thereof, and, for simplicity, like parts of the appliance have been supplied with the same reference numerals in all views.

In this drawing:

Figure 1 is a longitudinal section through a construction including the new invention;

Figure 2 is a cross-section through the same on line 2—2 of Figure 1; and

Figure 3 is a lengthwise section through the reed-seal on a larger scale.

By reference to the drawing, it will be noted that the rotary shaft 11 at one end is equipped with a revolving pump 12 or other operated mechanical structure creating a fluid-pressure, the shaft being accommodated in an externally and internally cylindrical housing 13 and the element 12 in its casing or housing 14, the two parts 13 and 14 being demountably connected together in any appropriate manner by screws 10, 10, the inner-surface of the intervening shaft-bearing 15 forming part of housing 13 having a circular, inwardly-projecting rib 16 concentric with a circular bearing aperture through wall 15 occupied by the shaft and in which the shaft revolves in performing its function of driving the pump.

Secured in the otherwise open right-hand end of housing 13 is a round, hollow bushing 17 through the bearing-member 20 of which the shaft 11 extends, the inner end of such member 17 having an inwardly-extended circular rib 18 like and in longitudinal register with rib 16, the chamber of such bushing 17 being filled with any suitable, conventional pump-packing 19 or its equivalent which has been constructed to leak outwardly slightly through the very shallow annular space between the interior of the associated retaining-nut 21 and the surface of the shaft.

Inside of the cylindrical-chamber in member 13, and through which the shaft 11 extends concentrically, is a single ring 21 encircling the shaft and concentric therewith and slightly larger in internal-diameter than the external-diameter of the shaft, the ring having an external-diameter slightly less than that of the inner-surface of the part 13, all as clearly portrayed in the drawing.

The circular center of ring 21 is of the same diameter as, and in alignment with, the corresponding centers of the two abutments 16 and 18 which constitute stops for the travel of the pressure-seal in opposite directions as will be appreciated from what follows.

Each end of ring 21 has an annular-chamber 22 with inwardly-converging, inner, smaller, circular and outer, larger, circular surfaces occupied by correspondingly-shaped, flaring, round reed-seals 23 whose intermediate webs have circularly-spaced apertures in register with complementary or companion, screw-threaded cavities in the opposite ends of the ring for the reception of screws 24, 24 extended through holes in an appropriately-tapered, ring reed-retainer 25 conforming to and holding in place the corresponding reed-seal, each such screw occupying registered holes in the parts 25, 23 and 21.

Each of these two reed-seals ordinarily consists of a plurality of nested or interfitted, annular, thin, resilient, sheet-metal, tapered or flaring rings held and maintained in such assembled relation by one of the retainers 25 and each having its inner, round edge projecting inwardly slightly beyond the corresponding surface of the ring 21 and each having its outer, round edge extended outwardly beyond the corresponding surface of such supporting ring 21, the inner edge-portions bearing yieldingly around the entire circumference of the shaft and the outer edge-portions bearing edgewise entirely around the inner surface of the housing 13, as is clearly depicted.

It will be noted that the two round reed-seals project lengthwise the shaft and its housing in opposite directions and adequately seal the fluid-pressure between the shaft and its spaced-away housing or casing 13.

It will be observed that this ring-like pressure-sealing structure is free to, and does, rotate with the shaft, the speed of slippage of the edges of the reeds against the surface of the shaft being materially reduced, and in effect, the bearing area of the reeds on the shaft is enlarged.

Another valuable feature and function involved in this novel construction is that if this rotating reed-seal is allowed to move lengthwise along the shaft, and if the rate of this movement is properly controlled, the bearing areas of the two reeds on the shaft and shaft-housing can be very largely increased.

This result is obtained in the present device due to the following structure and operation thereof.

The annular pressure-seal comprising the united elements 21, 22, 22, 23, 23, 24, 24, and 25, 25 tends to slide very slowly on the shaft to the right, as viewed in Figure 1, by reason of slight fluid-pressure leakage through the bearing 15 and acting on the left-hand end of the seal.

A self-closing grease-gun fitting 26 of ordinary type is mounted on, and with its passage extending through, the housing 13 and adapted to apply grease to its interior beyond the right-hand end of the seal and, by means of the pressure exerted by the grease introduced into the chamber by the grease-gun from time to time the reed seal structure can be forced along the shaft to the left toward the pump and then, as the pump is rotated by the shaft, the hydrostatic pressure through the leakage referred to gradually forces the reed-structure back to the right pushing the grease ahead of it through the pump-packing 19 and other means of slight external leakage.

The rate of such slow lateral motion can be controlled to be in the neighborhood of $1/1,000,000$ of an inch per revolution so that the only attention to the equipment required is a shot of grease about once a month or so.

In the present device a nominally-closed oil-hole 27 has been shown in the shaft-housing and one or more holes 28 is provided through the ring 21 so that by the use of oil through this means the reeds can always be traveling toward a freshly lubricated surface.

In order that the exposed edges of the reed-seals may not become damaged, or injured, by contact with either of the bearing-members 15 and 20 the opposed circular ribs 16 and 18 have been provided to engage the exposed heads of the screws and to act as stops limiting the extent of travel of the seal-structure in its opposite directions of movement.

It should be observed further that pressure is acting on the two reed structures in opposite directions tending to expand them against the surfaces with which they coact thus constantly assuring proper sealing and non-leakage at these points and thus affording effective and efficient action of the construction.

If either bearing does not provide the needed leakage it can readily be supplied by any other convenient medium to accomplish the desired purpose.

Those acquainted with this art will readily understand that the present invention is not necessarily limited to the precise and exact details of structure illustrated and described and that reasonable modifications may be availed of without departure from the heart and essence of the invention.

We claim:

1. In a pressure-seal between an internally cylindrical housing and an externally cylindrical member in said housing concentric with and spaced from one another and rotatable with relation to one another, the novel improvement that said seal includes in combination a rigid ring-support in and concentric with the annular space between said housing and member and spaced from both, a pair of annular, nested, thin, resilient, sheet-metal reeds truncated-cone shape in cross-section mounted in conforming correspondingly shaped cavities in the opposite ends of said ring-support, facing in opposite directions, and extending both inwardly and outwardly beyond the ring-support in edgewise pressure-sealing engagement with both said member and housing and with sufficient contact with the rotary element of the two to revolve on its axis, tapering rings occupying the cavities of said pair of nested reeds at both ends of the structure, and means fastening said rings in said reeds to said ring-support for suitable mounting thereon, said ring-support and its sealing reeds being free to rotate about their axis, said reed-equipped ring-support being slidable lengthwise on said member and housing.

2. The novel combination set forth in claim 1, including in addition the improvement that said housing has an automatically closed passage for the intermittent introduction of grease under pressure into said housing at one side of such reed-equipped ring-support.

3. The novel combination set forth in claim 1, in which said ring-support has a transverse passage therethrough between its two sets of reeds and in which the housing has a closable passage therethrough for the introduction of a lubricant to the space between said two sets of reeds.

WARREN C. KELLOGG.
ERNEST HANSHAW.

REFERENCES CITED

The following references are of record in the file of this patent:

UNITED STATES PATENTS

| Number | Name | Date |
|---|---|---|
| 1,973,323 | Adams | Sept. 11, 1934 |
| 2,214,261 | Roth | Sept. 10, 1940 |

FOREIGN PATENTS

| Number | Country | Date |
|---|---|---|
| 147,205 | Germany | 1902 |
| 78,727 | Sweden | 1933 |